(12) United States Patent
van Gassel et al.

(10) Patent No.: US 10,749,947 B2
(45) Date of Patent: Aug. 18, 2020

(54) METHOD AND APPARATUS FOR SIGNALING OF BUFFER CONTENT IN A PEER-TO-PEER STREAMING NETWORK

(75) Inventors: Jozef Pieter van Gassel, Tampere (FI); Igor Danilo Diego Curcio, Tampere (FI); Jani Antero Peltotalo, Tampere (FI); Marko Antti Juhani Saukko, Turku (FI); Lassi Ilari Väätämöinen, Tampre (FI)

(73) Assignee: Provenance Asset Group LLC, Pittsford, NY (US)

( * ) Notice: Subject to any disclaimer, the term of this patent is extended or adjusted under 35 U.S.C. 154(b) by 1541 days.

(21) Appl. No.: 12/491,184

(22) Filed: Jun. 24, 2009

(65) Prior Publication Data

US 2010/0332674 A1 Dec. 30, 2010

(51) Int. Cl.
*H04L 29/08* (2006.01)
*H04L 29/06* (2006.01)

(52) U.S. Cl.
CPC ........ *H04L 67/104* (2013.01); *H04L 65/4076* (2013.01); *H04L 65/4084* (2013.01); *H04L 67/1008* (2013.01); *H04L 67/1023* (2013.01); *H04L 67/101* (2013.01); *H04L 67/1002* (2013.01); *H04L 67/1068* (2013.01)

(58) Field of Classification Search
USPC ................. 709/201, 217, 227, 228
See application file for complete search history.

(56) References Cited

U.S. PATENT DOCUMENTS 7,672,235 B1 * 3/2010 Lian .................. H04L 12/66
370/230
2006/0174160 A1 8/2006 Kim
(Continued)

FOREIGN PATENT DOCUMENTS

| CN | 1723452 A | 1/2006 |
| CN | 101406060 A | 4/2009 |

(Continued)

OTHER PUBLICATIONS

Title: Provide VoD Service in Peer-to-Peer Network using Offset Ranking and Epidemic Diffusion Volume: Consumer Communications and Networking Conference, 2009. CCNC 2009. 6th IEEE Authors: Xing Chen; Qing Yang (Year: 2009).*

(Continued)

*Primary Examiner* — Glenton B Burgess
*Assistant Examiner* — Marshall M McLeod
(74) *Attorney, Agent, or Firm* — Dinsmore & Shohl LLP

(57) ABSTRACT

Methods, devices and computer program products for facilitating the selection of a sourcing peer in peer-to-peer (P2P) streaming environment are disclosed. These methods allow peers to select candidate source peers in an informed manner with low overhead and minimized complexity. These and other features are accomplished by signalling detailed information regarding the buffer contents to one or more requesting peers. This information includes the presence or absence of requested content segments and a listing of gaps in the requested content segments, which allow the requesting peers to select an appropriate sourcing peer. The selection of a sourcing peer is also effected by considering network connectivity and/or network congestion status between the sourcing and the requesting peers.

23 Claims, 6 Drawing Sheets

(56) References Cited

U.S. PATENT DOCUMENTS

| | | | | |
|---|---|---|---|---|
| 2007/0067485 A1* | 3/2007 | Stotland | ............ | H04L 29/06027 709/232 |
| 2007/0280255 A1* | 12/2007 | Tsang | ...................... | H04L 45/00 370/395.2 |
| 2009/0254659 A1 | 10/2009 | Li et al. | | |
| 2010/0198982 A1* | 8/2010 | Fernandez | ............ | G06Q 30/02 709/231 |

FOREIGN PATENT DOCUMENTS

| | | | | |
|---|---|---|---|---|
| WO | WO 2007/147320 | | 12/2007 | |
| WO | WO 2007/147320 A1 | | 12/2007 | |
| WO | WO 2008051974 A1 | * | 5/2008 | ......... H04L 29/1249 |
| WO | WO-2008051974 A1 | * | 5/2008 | ......... H04L 29/1249 |
| WO | WO 2009/005747 | | 1/2009 | |
| WO | WO-2009005747 A1 | * | 1/2009 | ......... H04N 7/17318 |

OTHER PUBLICATIONS

Xing, X., et al. "Provide VoD Service in Pear-to-Peer Network using Offset Rnaking and Epidemic Diffusion." Consumer Communications and Networking Conference, 2009. CCNC2009, 6th IEEE, Jan. 10, 2009.

International Search Report for PCT Application No. PCT/US2010/001177 dated Sep. 30, 2010.

Office Action for Chinese Application No. 201080027092.2 dated Feb. 12, 2015.

Office Action for Chinese Application No. 2010800270922 dated Sep. 7, 2015.

International Preliminary Report on Patentability (Chapter 1) with Written Opinion from International Application No. PCT/IB2010/001177 dated Jan. 4, 2012.

Xing, Xiaoqin, et al.; "A Multichannel MAC Protocol to Solve Exposed Terminal Problem in Multihop Wireless Networks"; IEEE; 2009; pp. 1-2.

Peltotalo, Jani, et al.; "RTSP-Based Mobile Peer-to-Peer Streaming System"; Hindawi Publishing Corporation; International Journal of Digital Multimedia Broadcasting; vol. 2010; 15 pages.

Office Action from Chinese Patent Application No. 201080027092.2 dated Jun. 12, 2014.

Office Action from Chinese Patent Application No. 201080027092.2 dated Feb. 19, 2016.

Supplementary European Search Report for Application No. EP 10 79 1693 dated Feb. 22, 2107.

Hei, X. et al., *IPTV Over P2P Streaming Networks: The Mesh-Pull Approach*, IEEE Communications Magazine, vol. 45 No. 2, (Feb. 1, 2008) pp. 1-4.

Sentinelli, A. et al., *A Survey On P2P Streaming Clients*, Wireless Internet, ICST (Nov. 17, 2008) pp. 1-4.

Magharei, N. et al., *Mesh or Multiple-Tree: A comparative Study of Live P2P Streaming Approaches*, Infocom 2007, 26th IEEE International Conference Computer Communications (2007) pp. 1424-1432.

* cited by examiner

METHOD AND APPARATUS FOR SIGNALING OF BUFFER CONTENT IN A PEER-TO-PEER STREAMING NETWORK

FIELD OF INVENTION

This invention relates to peer-to-peer (P2P) streaming. In particular, the present invention relates to facilitating P2P streaming of content between peers.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Peer-to-peer (P2P) is emerging as a potentially disruptive technology for content distribution to mobile devices over the Internet. It provides an alternative solution to the traditional client-server based approach by reducing the need for centralized servers. Next to the already well-known P2P file sharing, more recently real-time P2P streaming is gaining popularity. Real-time P2P streaming has a number of advantages that enable new applications and business models for the end-user, as well as other players in the value chain. P2P streaming technology, for instance, allows an end-user of a mobile device to broadcast its own content throughout the Internet. This task may be accomplished in real-time without the need for special infrastructure since the user's device, together with all other peers in the network, collectively form the infrastructure. Furthermore, unlike existing content distribution technologies, such as YouTube, that still require dedicated servers, servers may no longer be required in P2P streaming networks since every peer can serve data to any other peers.

These distributed characteristics make real-time P2P streaming an inherently scalable technology, allowing the distribution of an unprecedented number of content from content providers that include the end-users. Furthermore real-time P2P streaming has the potential of becoming a disruptive technology in the broadcasting world since every peer in the network can become an independent broadcaster. This is especially true in light of the recent proliferation of user generated content.

Live streaming and Video-on-Demand (VoD) streaming of content are two example applications where P2P streaming may be effectively utilized. With live streaming, a user typically receives an ongoing event, such as a sporting event, from the peers in the P2P network. The user may therefore start watching the live stream after an initial buffering delay. Furthermore, all peers in a live streaming scenario consume the content in substantially the same time frame. With VoD streaming, a user may request a desired video from a catalogue, and after a delay associated with initial buffering of the content, the user may start watching the requested video from the beginning. From a device manufacturing and usage point of view, Live and VoD P2P streaming applications have a number of important benefits. For instance, users can view the selected programs only after a short delay associated with buffering of the content, as opposed to waiting for the entire file to be downloaded. This feature also reduces device memory requirements, and allows memory resources to be allocated to other applications, a feature that is especially beneficial to mobile devices, with relatively small internal memory.

The user experience and the performance of a real-time P2P streaming service is highly dependent on content availability at the source peers. The peers in a P2P streaming environment, however, are not currently capable of efficiently assessing the availability of a desired content at other peers in the P2P streaming network.

SUMMARY OF THE INVENTION

The various embodiment of the present invention enable reliable operation of a P2P streaming system by allowing the peers in such a system to assess various information related to content availability at a plurality of candidate source peers. The various embodiments of the present invention thus allow a peer client to make informed decisions when selecting new streaming source in a P2P streaming environment. One aspect of the present invention relates to a method, comprising receiving a request for a content at a candidate source peer from an entity in a peer-to-peer streaming network, and providing information related to availability of the content and detailed buffer status of the candidate source peer to one or more requesting peers, wherein the information enables the one or more requesting peers to select a peer for receiving the content. In one embodiment, the request comprises at least one of a plurality of sequence numbers or a plurality of normal play time (NPT) values associated with the content.

According to another embodiment, the information comprises a status code associated with the availability of the content. In one alternative, the information further comprises a list of available content segments within a range of requested content segments and/or a list of gaps associated with lost segments within the range of requested content segments, and the status code provides an indication of at least one of a future content or a past content. In another alternative, the status code provides an indication of at least one of: a future content, a past content, an insufficiency of bandwidth, a redirection, an availability of a partial content, and an availability of a complete content. In another embodiment, receiving the request and providing information are effected within a real-time transport streaming protocol (RTSP) session setup procedure while in a different embodiment, receiving the request and providing information are effected outside of a real-time transport streaming protocol (RTSP) session setup procedure. In yet another embodiment, the information contains one or more of the buffer start time, the buffer end time, the buffer duration, the buffer storage capacity, a first sequence number stored in the buffer, a last sequence number stored in the buffer, an extent list of gaps, a percentage of available content within a requested range, and an indication as to completeness of content within the buffer.

According to a another embodiment, the request is received by the candidate source peer directly from the one or more requesting peers, and the information is provided directly to the one or more requesting peers by the candidate source peer. In a different embodiment, the request is received by the candidate source peer from a central entity within the peer-to-peer streaming network, and the information is provided to the central entity by the candidate source peer. In yet another embodiment, the request is initiated by the one or more requesting peers in a decentralized distributed peer-to-peer streaming network, and the information is provided by the candidate source peer to the one or more requesting peers through one or more other peers in the decentralized distributed peer-to-peer streaming network.

Another aspect of the present invention relates to a method, comprising initiating a request for a content at a requesting peer in a peer-to-peer streaming network, and receiving information related to availability of the content and detailed buffer status of one or more candidate source peers at the requesting peer. A different aspect of the present invention relates to an apparatus, comprising a receiver configured to receive a request for a content from an entity in a peer-to-peer streaming network, and a transmitter configured to transmit information related to availability of the content and detailed buffer status of the candidate source peer to one or more requesting peers. A different aspect of the present invention relates to an apparatus, comprising a transmitter configured to initiate a request for a content at a requesting peer in a peer-to-peer streaming network, and a receiver configured to receive information related to availability of the content and detailed buffer status of one or more candidate source peers at the requesting peer.

Another aspect of the present invention relates to a computer program product, embodied on a computer readable medium, comprising computer code for receiving a request for a content at a candidate peer from an entity in a peer-to-peer streaming network, and computer code for providing information related to availability of the content and detailed buffer status of the candidate source peer to one or more requesting peers. Yet, a different aspect of the present invention relates to a computer program product, embodied on a computer readable medium, comprising computer code for initiating a request for a content at a requesting peer in a peer-to-peer streaming network, and computer code for receiving information related to availability of the content and detailed buffer status of one or more candidate source peers at the requesting peer.

In another aspect of the present invention an apparatus comprises a processor, and a memory unit operatively connected to the processor and including: computer code for receiving a request for a content at a candidate source peer from an entity in a peer-to-peer streaming network, and computer code for providing information related to availability of the content and detailed buffer status of the candidate source peer to one or more requesting peers, wherein the information enables the one or more requesting peers to select a source peer for receiving the content. Another aspect of the invention relates to an apparatus comprising a processor, and a memory unit operatively connected to the processor and including: computer code for initiating a request for a content at a requesting peer in a peer-to-peer streaming network, and computer code for receiving information related to availability of the content and detailed buffer status of one or more candidate source peers at the requesting peer, wherein the information enables the requesting peer to select a source peer for receiving the content.

These and other advantages and features of various embodiments of the present invention, together with the organization and manner of operation thereof, will become apparent from the following detailed description when taken in conjunction with the accompanying drawings.

BRIEF DESCRIPTION OF THE DRAWINGS

Embodiments of the invention are described by referring to the attached drawings, in which.

DETAILED DESCRIPTION OF THE PREFERRED EMBODIMENTS

Figure 1:
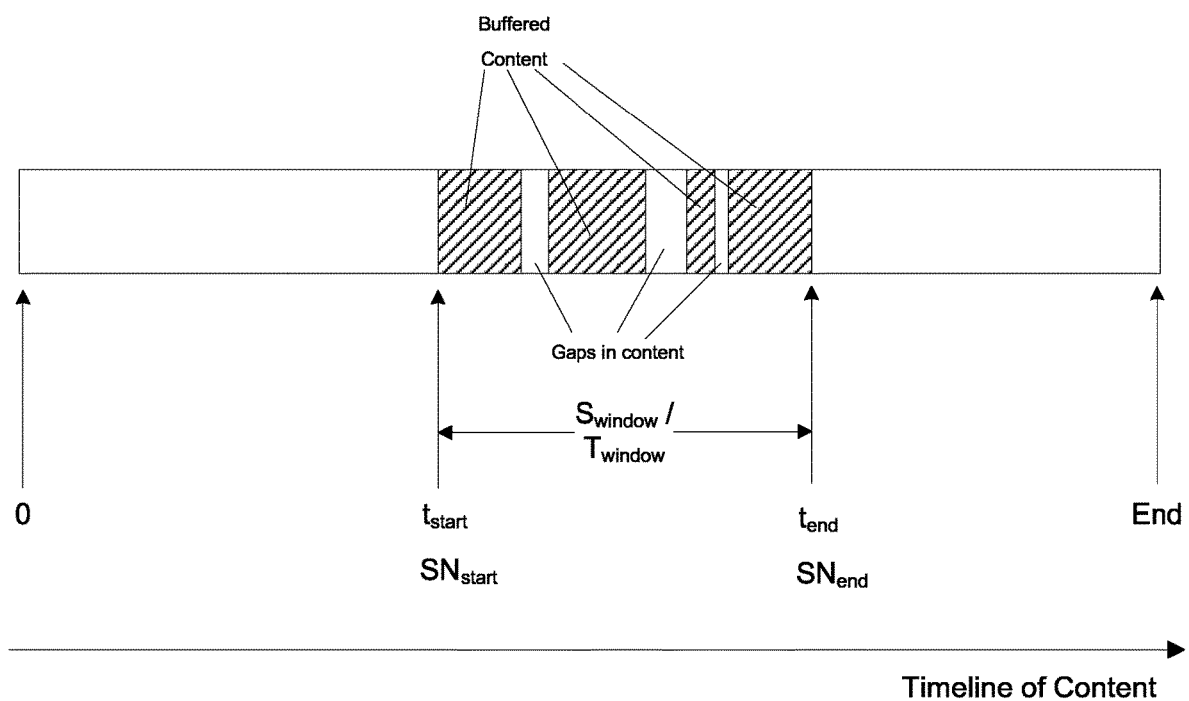
FIG. 1 is a block diagram illustrating the contents of a buffer and associated parameters in accordance with an exemplary embodiment of the present invention.

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

As used herein, the term "content" includes any data that may be exchanged in a P2P network. A content, for example, may include one or more full or partial video and/or audio streams, text information, still images, or any other data that may be available at a peer. In a P2P streaming environment, a requesting peer may request such content from one of more candidate source peers.

In a real-time P2P streaming system, the performance of the system is highly dependant on the selection of suitable peers for serving all or part of the requested content. If the peers are connected over bad network connections that, for example, result in long network latencies or high packet loss rates, or are communicating through saturated network links, they will not be able to effectively provide the requested streams and/or partial streams to the destination peers. This will result in an inferior end-user experience.

Another key criterion in peer selection in real-time P2P streaming systems is content availability at the candidate source peer. There is no point in requesting data from a candidate peer that has no access to the requested content in the first place. However, even if the candidate source peer has access to the content, content availability may still be impaired due to a number of reasons. By the way of example, and not by limitation, content availability at a candidate source peer may be impaired in any one of the following non-exclusive scenarios: (a) the candidate source peer is not consuming the content itself, (b) the candidate source peer has joined the service at a later stage, (c) the candidate source peer's playback point is at a time instant prior to the time instant associated with the requested content, (d) the content is not delivered due to network connectivity issues that result, for example, in high packet loss rates or failing peers, or (d) the required content has already been removed from the candidate source peer's cache/buffer. Improper selection of streaming (sourcing) peers may also cause a large number of peers to reconnect to other alternative peers in order to obtain the missing data, which may lead to system instability and degraded user experience.

It is therefore advantageous to be able to discern information related to content availability at the peers in a P2P streaming system. In a live P2P streaming scenario, where all peers are consuming a particular service (e.g., a media representation) at approximately the same play-out point, content availability may be implicit when a peer is consuming the service. However, content availability awareness becomes more important in the following non-exclusive example scenarios: (1) retransmissions, where peers request retransmission of packets that have been lost due to network failure, peer churn or failure, or (2) VoD services, where, in contrast to a live services, not all peers are consuming the service at the same play-out point of the content representation. For example, peers can start the service at arbitrary times and can use trick modes (e.g. seeking, fast forwarding and pausing) to move the play-out point to arbitrary positions within the media.

It is therefore important to enable reliable operation of a P2P streaming system by allowing the peers to assess various information related to content availability at a candidate source peer, and to make informed decisions as to the selection of new streaming sources in a P2P streaming environment. To this end, the various embodiments of the present invention provide for extending the stream setup procedures by signaling additional information in the form of new status codes and a special data format describing the detailed contents of the buffer/cache of candidate source peers. The status codes, which will be described in further detail in the sections that follow, provide high level information that can be used by a requesting peer (i.e., the peer querying buffer content information) to assess the quality of the candidate source peers in terms of content availability.

Additionally, a candidate source peer may use the status codes to redirect the requesting peer(s) to a better candidate source peer. For example, a redirect action may be appropriate when the desired content is available in the cache/buffer of the candidate source peer but the network link to the requesting peer is saturated. In this case, the candidate source peer may redirect the request to other peers with known good data availability. These other peers may include peers that are already being served with the requested information (i.e., either directly from the candidate source peer or via intermediate peers). Such information may be obtained, for example, by examining the ancestor list (i.e. path in streaming graph).

The various embodiments of the present invention further provide additional detailed information regarding the contents of cache/buffer (i.e. the streaming contents of the local cache). In one exemplary embodiment, this information may be incorporated in the body of the response messages sent by the candidate source peer, and may be further used by the requesting peer(s) to compare multiple candidate source peers in more detail. For example, the detailed information that may be included in a response message may include, but is not limited to, the cached/buffered time window within the total playback timeline of the complete media representation in terms of time and sequence numbers. Furthermore, the detailed information may include other metadata such as a detailed list of gaps that may be present in the local buffer of the source peer due to, for example, packet loss. As such, the detailed information may convey a complete description of the playback window of a peer, as it exists at a certain instant in time. The selection of one of more suitable peers based on the signaled status codes and detailed cache/buffer content information may be particularly useful in retransmission requests of lost packets, or in the context of jumping to a new playback point in a stream (i.e. special trick modes as used in VoD applications). However, it should be noted that the various embodiments of the present invention are equally applicable to other scenarios that involve the selection of a suitable peer in a P2P streaming environment.

According to an example embodiment, the setup of the requested Real-time Transport Protocol (RTP) session may be carried out using the Real-Time Streaming Protocol (RTSP) session setup procedures. RTSP establishes and controls one or more time-synchronized streams of continuous content, and allows a client to remotely control a streaming peer. Although the sending of the streaming content itself is not part of the RTSP protocol, a standards-based protocol such as RTP may be used as the transport protocol for delivery of the actual content. The peer that is evaluating one or more candidate source peers may send a RTSP SETUP message for setting up a transport mechanism for the continuous media stream. The SETUP message includes all transport initialization information. Once proper transport mechanism has been set up between the requesting and sourcing peers, playback of the stream may be requested by the peer by sending a PLAY message to a suitable candidate source peer. Note that, for efficiency reasons, these requests can be pipe-lined (i.e., send by the requesting peer without waiting for each response). For example, if a PLAY request arrives while a previous PLAY request is still active, the new request may be delayed until the first PLAY has been completed. A PLAY request positions the normal play time to the beginning of a range specified by the requesting peer in the Range header field, and delivers the content until the end of the specified range is reached. Note that, in RTSP 1.0, an extension of the Range header field to include sequence numbers associated with the requested portions of the content is not possible. For this reason, a new Packet-Range header field was introduced. In RTSP 2.0, however, the existing Range header field can be extended to include the sequence numbers.

According to an embodiment of the present invention, upon receiving a request, the candidate source peer evaluates the requested range, which may be specified in the Range header field, and responds with one of the RTSP status codes that is shown in Table 1. Under RTSP, a status code appears in the first line of a Response message, and it comprises a 3-digit numerical code. Each code is followed by an associated textual phrase, called "Reason," which provides a concise description of the status code.

TABLE 1

Status Code Values Associated with a Peer Response

| Status Code | Reason |
| --- | --- |
| 4xx | Future Content |
| 4xx | Past Content |
| 453 | Not Enough Bandwidth |
| 3xx | Redirection |
| 200 | OK |
| 206 | Partial Content |

It should be noted that in place of the unspecified status code digits (i.e. digits designated by "xx") any available status code digits may be used. In case of the Redirection response, there may be multiple possible status codes in the 300 range. The various status codes that are listed in Table 1 provide the following information regarding the candidate source peer:

Future Content (code 4xx): This code indicates that the requested range is in the future compared to the candidate source peer's buffer contents. As such, the candidate source peer is of no immediate use since it cannot serve the requested content. However, the candidate source peer may still be useful in the future, for example, if the candidate source peer jumps ahead in the stream or catches up to the requested range in any other way.

Past Content (code 4xx): This code indicates that the requested range is in the past compared to the candidate source peer's buffer contents. As such, the peer is of no immediate use since it cannot serve the requested content. However, the candidate source peer may still be useful in the future, for example, if the candidate source peer jumps back in the stream or pauses for some time.

Not Enough Bandwidth (code 453): This code indicates that the candidate source peer does not have enough bandwidth available to successfully handle the given request.

Redirection (code 3xx): This code indicates that the candidate source peer may have the requested content available, but cannot accommodate the request. For example, the candidate source peer may not have the necessary bandwidth to serve the requested content but may redirect the requester to another peer that has the requested content. This response provides other location(s) that may be able to accommodate the request for the desired content. The exact response code values may be selected from any of the responses defined in RTSP specifications.

OK (code 200): This code indicates that the requested streaming content is available and will be streamed to the requesting peer from the candidate source peer.

Partial Content (code 206): This code indicates that the requested streaming content is partially available and will be streamed to the requesting peer from the candidate source peer. This response may contain information regarding the specific parts that are actually streamed to the requesting peer, as defined in RTSP specifications.

FIG. 1 provides an exemplary diagram for illustrating the contents of a buffer/cache of a peer in a P2P streaming environment. The buffer contents are depicted as dashed rectangles as part of the complete timeline of content. The boundaries of the cached content may be defined by the following parameters:

$t_{start}$ designates the buffer start time (e.g. Normal Play Time—NPT);

$t_{stop}$ designates the buffer end time (e.g. normal play time—NPT);

$T_{window}$ designates buffer duration (e.g., in milliseconds);

$S_{window}$ designates buffer storage capacity (e.g., in bytes);

$SN_{start}$ designates the first sequence number stored in the buffer;

$SN_{stop}$ designates the last sequence number stored in the buffer;

Extent list of gaps (not shown in FIG. 1) identifies each individual gap related to the missing content within the content window of interest. It should be noted that the convention used to provide the listing of gaps may need to accommodate sequence number wrap-around, with a threshold for compacting the representation. The gaps may be expressed in suitable units, such as in terms sequence numbers, time, byte position, and the like. Further details related to the sequence number wrap-around considerations will be discussed in the sections that follow.

The parameters associated with the buffer contents that are depicted in FIG. 1 may be encoded into an XML format that is carried in the body of the RTSP response message, as illustrated in the following example listing:

```
<buffer>
  <npt start="1239124" stop="12312415" />
  <sn start="1234" stop="3235" />
  <gapList>1250-1300,1305,2030-2555</gapList>
</buffer>
```

Note that while the above XML format provides an example format for signaling the parameters associated with the buffer contents, the actual syntax for such signaling may be carried out using other formats. Further, care must be taken when utilizing sequence numbers for identifying the listed gaps. In particular, in RTP, 16-bit sequence numbers are used to uniquely identify $2^{16}$ or 65,536 packets. However, this range may not be sufficient to uniquely identify large gaps in the buffer/cache contents that have exceeded the 65,536 sequence numbering limit. As a result, sequence numbers may wrap around, making it difficult to uniquely identify packets in the listed gap of lost packets. This limitation can be overcome in a number of different ways. In one alternative, the wrap-around may be encoded explicitly. For example, the occurrence of warp-around may be explicitly signaled in the gap extent list. In a different alternative, wrap-around occurrences can be reduced by using extended sequence numbers. For instance, the range of sequence numbers can be significantly increased by extending the width of sequence numbers from 16 bits to, for example, 32 or 64 bits. Additionally, or alternatively, the number of sequence number wrap-around occurrences may be minimized by defining the sequence number at the origin of the list of gaps to be zero. In this case, the actual sequence numbers may be calculated by using the absolute sequence number values that are used to signal the start and end of the cached packets as offsets.

In cases where the size of internal streaming data buffer/cache is large, such as in VoD applications, special precautions may be taken to compact the extent list of gaps. For instance, a single partial stream may be missing due to, for example, failure of a peer that was serving this information, for part or the entire duration of the buffered time window. In one alternative embodiment, instead of individually listing the packets assigned to this partial stream, the partial stream itself may be identified by its configuration parameters in combination with start point and loss duration within the time window. Furthermore, if only individual packet losses or very short error bursts in an otherwise correctly received time duration occur, these losses may be filtered out. For example, the filtering out process may involve determining if the length and/or number of error bursts is below a certain threshold. Alternatively, or additionally, the extent of lost content may be signaled relative to the duration of the originally sent content. For example, the number of lost packets may be specified as a ratio and/or percentage of the total number of originally sent packets. In another variation, both the number of lost packets and the number of sent packets may be signaled. The above signaling may be carried for only the gaps that exceed a pre-defined threshold. For example, if the threshold value is set to zero, all content gaps will be signaled. As such, the threshold value may be used to control the number of gaps that are reported.

The information related to the buffer contents of a candidate source peer is a snapshot of the current buffer contents at the time of its transmission by the respective candidate source peer. A requesting peer may also use this information to estimate future status of the buffer contents by extrapolating the information to a future point in time. As depicted earlier in FIG. 1, the buffer contents of a candidate source peer may be represented by a window. Over time, as the candidate source peer streams its content, existing content data is removed and new data will be added. This way, the window slides along the time line with a certain size and varying point of origin. Since the origin of the sliding time window and the size of the window are known, a requesting peer can estimate the contents of the buffer at a future point in time. A peer may choose to cache the information associated with buffer contents of various candidate source peers in order to maintain a list of suitable candidates for future references. The peer can either use this information to connect directly to these peers or make a sub selection of peers to query for more up-to-date buffer content information. While this methodology helps excluding peers that are unlikely to have good data availability, it should be noted that the extrapolated buffer status information only provides an estimate of future content status. As such, it may not accurately predict packet losses that may occur in the future due to, for example, candidate source peer's jump to a different play-back point in the stream or its departure from the service altogether.

Other parameters may also be provided to allow an assessment of content availability quality of a candidate source peer. These parameters may be signaled to allow a requesting peer to assess the status a candidate source peer's buffer without the need to evaluate the buffer contents in detail. An example parameter is the percentage of available packages within the requested range (i.e. the intersection of the requested and buffered content excluding lost packets). Another example parameter may comprise signaling the completeness of the available content in the cache (i.e. the buffered content excluding lost packets). Note that, in addition to data availability measures associated with buffer contents of a candidate source peer, an evaluating peer should also take into account network conditions before selecting a final peer. These network conditions may, for example, include the available bandwidth and latencies associated with the network.

Figure 2:
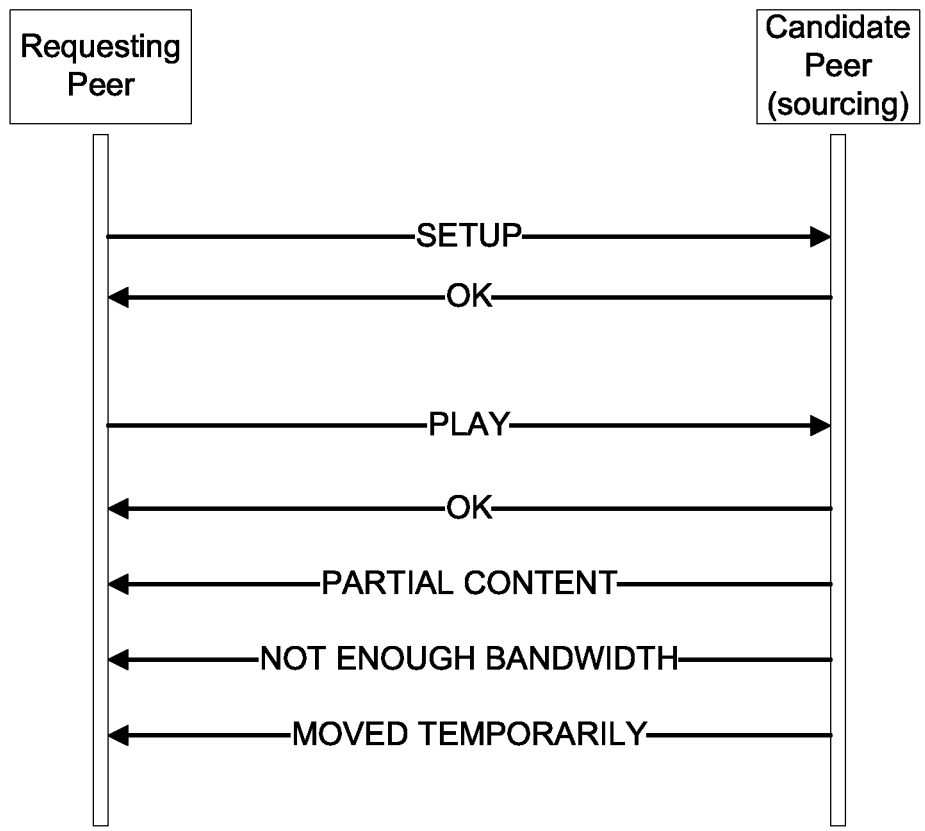
FIG. 2 is a flow diagram illustrating the exchange of information between peers in a peer-to-peer network in accordance with an exemplary embodiment of the present invention.

The following listing illustrates a sequence of example RTSP messages that may be used to assess buffer content and network availability of a peer in a P2P streaming environment. A simplified flow diagram associated with the following sequence of messages is also depicted in FIG. 2.

```
SETUP rtsp://192.168.0.2:8555/87/0 RTSP/1.0
CSeq: 327728
Require: RTP2P-v1
Client-Port: 8555
Transport: RTP/AVP;unicast;client_port=8568
Peer-Id: 431
RTSP/1.0 200 OK
CSeq: 327728
Peer-Id: 430
PLAY rtsp://192.168.0.2:8555/87/0 RTSP/1.0
CSeq: 327729
Require: RTP2P-v1
Packet-Range: 1250-1300;1305;2030-2555;
Peer-Id: 431
RTSP/1.0 200 OK
CSeq: 327729
Peer-Id: 430
RTSP/1.0 206 Partial Content
CSeq: 327729
Peer-Id: 430
Packet-Range: 1250-1300;1305;
RTSP/1.0 453 Not Enough Bandwidth
```

```
CSeq: 327729
Peer-Id: 430
RTSP/1.0 302 Moved Temporarily
CSeq: 327729
Peer-Id: 430
Location: rtsp://192.168.0.12:8555
```

The first segment of the above listing illustrates an RTSP SETUP message that is sent by a requesting peer in order to set up a connection with a candidate source peer. Upon receiving an OK response from the candidate source peer, the requesting peer issues a PLAY message to start retrieving a streaming content. In the above example listing, the PLAY message identifies the requested content packets to be in the range 1250-1300, 1305, and 2030-2555. The above listing of RTSP messages and the flow diagram of FIG. 2 illustrate four exemplary responses to the PLAY request. These include OK, Partial Content (e.g., only packets in the range 1250-1300 and 1305 are available), Not Enough Bandwidth, and Moved Temporarily. The four exemplary responses provided in the above listing represent alternative responses to the PLAY request. If the candidate source peer's response indicates too many gaps, or is unacceptable to the requesting peer in other ways, the requesting peer may tear down the session and select another source peer. Alternatively, the requesting peer may request and receive only the lost contents of a first candidate source peer (i.e., gaps) from a second candidate source peer while still receiving the originally requested content from the first source peer. Note that all the responses in the above example may include the buffer content fragment information in XML format that is embedded, for example, in RTSP requests and responses. For example, an RTSP response may comprise the following:

```
RTSP/1.0 200 OK
CSeq: 327729
Content-Length: 136
Content-Type: text/xml
Peer-Id: 430
<buffer>
<npt start="1239124" stop="12312415" />
<sn start="1234" stop="3235" />
<gapList>1400-1410,1507,3100-3207</gapList>
</buffer>
```

While the above example has been described in the context of RTSP messages for specific content segments, it is understood that the various features of the present invention are applicable to other P2P streaming protocols that allow the exchange of information between two or more peers. As such, based on the principles of the present invention, a requesting peer may initiate a request for content and receive a response for this request from one or more candidate source peers in the P2P streaming network. The response entails information related to the availability of content and detailed buffer status of each candidate source peer. For example, the response may identify the available segments within a requested range of content segments, a listing of gaps associated with lost packets within the requested segments, network congestion and other bandwidth-related information.

In an alternative embodiment, special out-of-band messages (i.e. outside the RTSP session setup procedure) may be used to request buffer contents of a candidate source peer. For this purpose, RTSP-based, or more generally HTTPbased, messages may be used. The procedure is similar to one described in connection with the RTSP session setup in the sense that the requesting peer indicates the required content range and the candidate source peer replies using any of the status codes to signal detailed buffer information. However, in contrast to the RTSP setup procedure, where both a SETUP and a PLAY are needed, a single request is sufficient to communicate the requested information using the above-noted out-of-band messaging technique. Using out-of-band messaging eliminates the need to undertake an entire RTSP setup procedure merely for the purpose of querying the availability of data. Additionally, out-of-band messaging allows a requesting peer to query cache/buffer content information from a number of candidate source peers in parallel, without setting up and tearing down the RTSP sessions.

In an alternative embodiment of the present invention, centralized entities in the overlay P2P network may acquire the above-described detailed information corresponding to cache/buffer contents of various peers in the network. Examples of such centralized implementations include the centralized Service Discovery Server (SDS) of the P2P network or a cluster leader of a suitable cluster in the overlay network. The former comprises a single entry point for all peers in the overlay network. However, since the SDS may become flooded with buffer content queries and updates, this option may not provide an optimal solution where scalability to larger overlays is desired. In such cases, the second approach that involves clusters may provide better scalability due to the limited size of the cluster. This approach, however, may increase the signaling overhead, as the cluster leader must receive updates regarding buffer contents of the various peers in the cluster.

In a yet another alternative embodiment, RTP Control Protocol (RTCP) may be used to signal the buffer contents to respective peers. RTCP is a sister protocol of RTP that provides out-of-band control information. RTCP may be used with RTP to effect the delivery and packaging of multimedia content, and to provide feedback on the quality of service that is being provided by RTP, but it does not transport any multimedia data itself. Since RTCP reports can only be sent inside the context of an existing RTP session, in applications where peers are already receiving content from the sourcing peer, RTCP may be used to signal the above-described detailed information regarding buffer contents to the receiving peers. This technique may also be used to assess future buffer contents. For example, a receiving peer may anticipate upcoming buffer gaps and mitigate potential losses by setting up alternative connections before such losses occur. In this scenario, the RTCP sender report syntax may be extended to carry the buffer content information in a binary format.

In still another alternative embodiment, decentralized distributed technologies, such as Distributed Hash Tables (DHT), may be used to distribute the above-described detailed information regarding buffer contents of individual peers among some or all other peers in the overlay network. DHTs provide decentralized distributed services that enable efficient scalability, and allow minimal disruptions when changes in the participating peers occur. Using decentralized distributed technologies for signaling data availability and network information is similar to the above-described centralized/cluster approach in that third parties (i.e. neither the requesting nor the candidate source peer) are being used for obtaining buffer content information. However, this methodology may also increase the amount of information that needs to be signaled in the overlay network as the number of nodes (peers) grow. The information update speed of DHT-like technologies may also be insufficient compared to the update granularity or dynamics that is required to accurately convey the changes in a particular peer's buffer contents.

Figure 3:
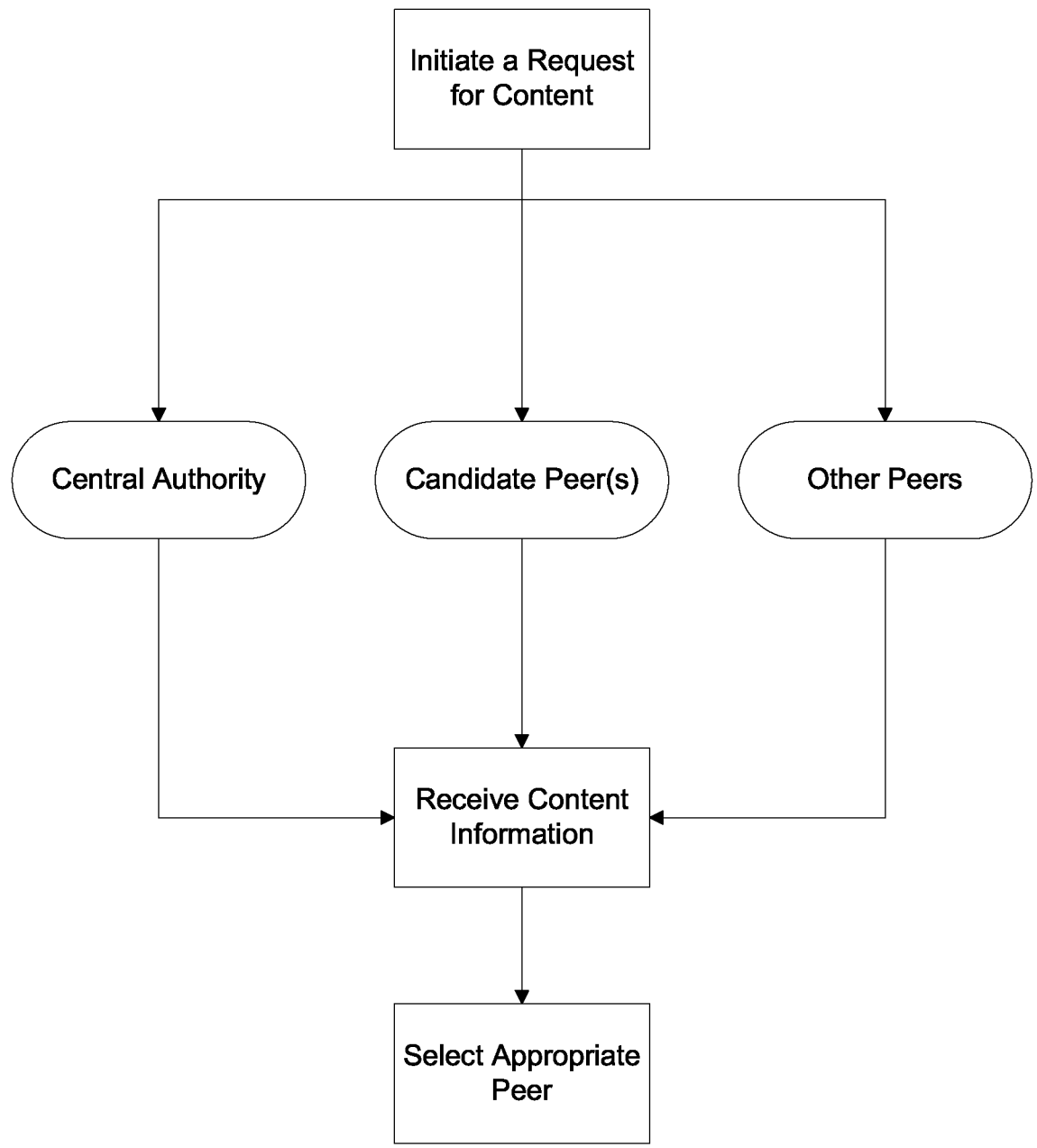
FIG. 3 is a block diagram illustrating the selection of an appropriate candidate sourcing peer in a P2P streaming network in accordance with an example embodiment of the present invention.

FIG. 3 is a block diagram illustrating the various operations involved in the selection of an appropriate candidate source peer in a P2P streaming network according to an example embodiment of the present invention. The process begins when a requesting peer initiates a request for a specific content. This request may be sent to a central authority and/or a cluster leader, or directly to one or more candidate source peers, or to other peers that neither the requesting nor the candidate source peer in a decentralized distributed network. Once the request reaches one or more candidate source peers that have access to all or some of the requested content, the candidate source peer(s) may respond to the request, providing information related to the availability of content, network connectivity information, and detailed status information regarding buffer contents of the candidate source peer(s). The requesting peer can then make an informed decision regarding the availability and quality of requested content provided by various peer(s).

Figure 4:
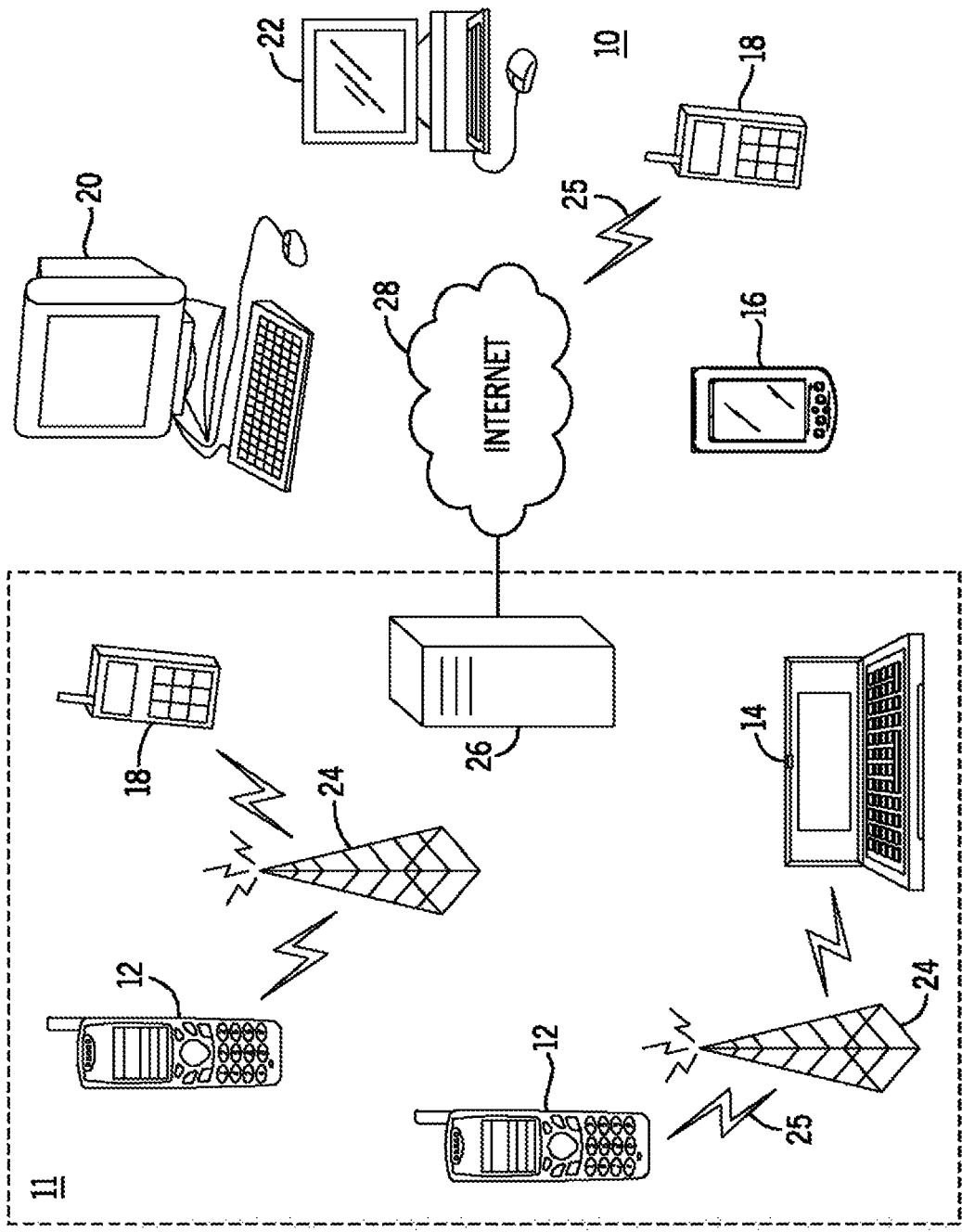
FIG. 4 is an overview diagram of a system within which various embodiments of the present invention may be implemented.

FIG. 4 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 4 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, an electronic device 12 in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls, stream multimedia and messages, and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, RTP/RTSP based multimedia streaming, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 5:
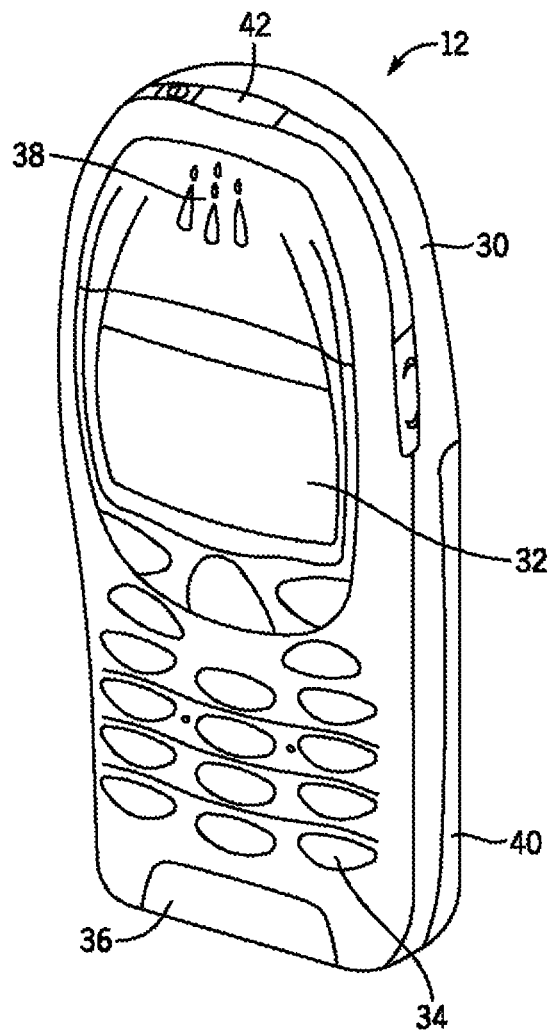
FIG. 5 is a perspective view of an electronic device that can be used in conjunction with the implementation of various embodiments of the present invention.
Figure 6:
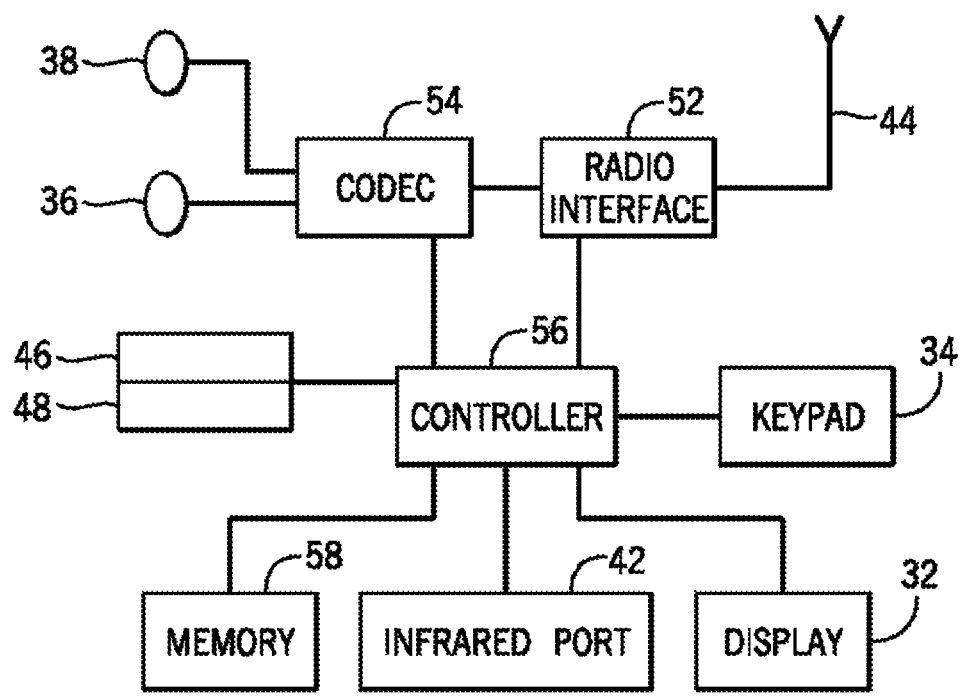
FIG. 6 is a schematic representation of the circuitry which may be included in the electronic device of FIG. 5.

FIGS. 5 and 6 show one representative electronic device 12 which may be implemented in a P2P streaming environment. For example, the electronic device 12 may comprise one or more of a sourcing peer, requesting peer, cluster leader, another participating entity in the streaming environment, or a combination thereof. It should be understood, however, that the present invention is not intended to be limited to one particular type of device. The electronic device 12 of FIGS. 5 and 6 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art, for example in the Nokia range of mobile telephones.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
   receiving, at a candidate source peer, a first request in order to setup a connection with the candidate source peer from an entity in a peer-to-peer streaming network;
   receiving, at the candidate source peer, a second request for a content at the candidate source peer once setup is complete;
   providing, from the candidate source peer, in response to receiving the second request, information related to availability of the content and detailed buffer status of the candidate source peer to one or more requesting peers, wherein the information relating to the candidate source peer enables the one or more requesting peers to select the candidate source peer as a selected candidate source peer to provide the content to the one or more requesting peers;
   selecting, by the one or more requesting peers, the candidate source peer as the selected candidate source peer based on the information;
   providing, from the selected candidate source peer, the content to the one or more requesting peers in response to the selection, by the one or more requesting peers, of the candidate source peer such that the candidate source peer is configured to simultaneously provide the content to more than one requesting peer; and
   when the selected candidate source peer determines in response to the selection that the second request for the content is not able to be accommodated, redirecting the second request to a redirect candidate source peer able to accommodate the second request to enable the one or more requesting peers to select the redirect candidate source peer to provide the content to the one or more requesting peers.

2. The method of claim 1, wherein the second request comprises at least one of a plurality of sequence numbers or a plurality of normal play time (NPT) values associated with the content.

3. The method of claim 1, wherein the information comprises a status code associated with the availability of the content.

4. The method of claim 3, wherein
   the information further comprises a list of available content segments within a range of requested content segments or a list of gaps associated with lost segments within the range of requested content segments; and
   the status code provides an indication of at least one of a future content or a past content.

5. The method of claim 1, wherein the information contains one or more of:
   the buffer start time;
   the buffer end time;
   the buffer duration;
   the buffer storage capacity;
   a first sequence number stored in the buffer;
   a last sequence number stored in the buffer;
   an extent list of gaps;
   a percentage of available content within a requested range; and
   an indication as to completeness of content within the buffer.

6. The method of claim 1, wherein receiving the second request and providing information are effected within a real time transport streaming protocol (RTSP) session setup procedure.

7. The method of claim 1, wherein receiving the second request and providing information are effected outside of a real time transport streaming protocol (RTSP) session setup procedure.

8. The method of claim 1, wherein the second request is received by the candidate source peer directly from the one or more requesting peers, and the information is provided directly to the one or more requesting peers by the candidate source peer.

9. The method of claim 1, wherein the second request is received by the candidate source peer from a central entity within the peer-to-peer streaming network, and the information is provided to the central entity by the candidate source peer.

10. The method of claim 1, wherein the second request is initiated by the one or more requesting peers in a decentralized distributed peer-to-peer streaming network, and the information is provided by the candidate source peer to the one or more requesting peers through one or more other peers in the decentralized distributed peer-to-peer streaming network.

11. A method, comprising:
   initiating, at a requesting peer, a first request to one or more candidate source peers in order to setup a connection with the requesting peer from an entity in a peer-to-peer streaming network;
   initiating, at the requesting peer, a second request to the one or more candidate source peers for a content at the requesting peer, once setup is complete;
   receiving, at the requesting peer, in response to initiating the second request, information related to availability of the content and detailed buffer status of the one or more candidate source peers, wherein the information of the one or more candidate source peers enables the requesting peer to select the candidate source peer as a selected candidate source peer to provide the content to the requesting peer;
   selecting, by the requesting peer, the selected candidate source peer among the one or more candidate source peers that serves as the selected candidate source peer for another requesting peer, based on the received information;
   receiving, at the requesting peer in response to the selecting, the content from the selected candidate source peer; and
   when the selected candidate source peer determines in response to the selection that the second request for the content is not able to be accommodated, redirecting the second request to a redirect candidate source peer able to accommodate the second request to enable the requesting peer to select the redirect candidate source peer to receive the content.

12. An apparatus, comprising:
   a receiver configured to receive a first request from one or more requesting peers in order to setup a connection with a candidate source peer, wherein the one or more requesting peers are an entity in a peer-to-peer streaming network;
   the receiver further configured to receive a second request from one or more requesting peers for a content of the candidate source peer once setup is complete;
   a transmitter configured to transmit from the candidate source peer, in response to the received second request, information related to availability of the content and detailed buffer status of the candidate source peer to the one or more requesting peers, wherein the information about the candidate source peer enables the one or more requesting peers to select the candidate source peer as a selected candidate source peer to provide the content to the one or more requesting peers;
   the one or more requesting peers configured to select the selected candidate source peer;
   the transmitter further configured to transmit, from the selected candidate source peer, the content to the one or more requesting peers in response to selection of the candidate source peer such that the candidate source peer is configured to simultaneously provide the content to each of the requesting peers that select the candidate source peer for receiving the content; and
   when the selected candidate source peer determines in response to the selection that the second request for the content is not able to be accommodated, the transmitter is configured to redirect the second request to a redirect candidate source peer able to accommodate the second request to enable the one or more requesting peers to select the redirect candidate source peer to provide the content to the one or more requesting peers.

13. The apparatus of claim 12, wherein the second request comprises at least one of a plurality of sequence numbers or a plurality of normal play time (NPT) values associated with the content.

14. The apparatus of claim 12, wherein the information comprises a status code associated with the availability of the content.

15. The apparatus of claim 14, wherein the information further comprises a list of available content segments within a range of requested content segments or a list of gaps associated with lost segments within the range of requested content segments; and
   the status code provides an indication of at least one of a future content or a past content.

16. The apparatus of claim 12, wherein the information contains one or more of:
   the buffer start time;
   the buffer end time;
   the buffer duration;
   the buffer storage capacity;
   a first sequence number stored in the buffer;
   a last sequence number stored in the buffer; an extent list of gaps;
   a percentage of available content within a requested range; and
   an indication as to completeness of content within the buffer.

17. The apparatus of claim 12, wherein the receiver and the transmitter are configured to operate within a real-time transport streaming protocol (RTSP) session setup procedure.

18. The apparatus of claim 12, wherein the receiver and the transmitter are configured to operate outside of a real-time transport streaming protocol (RTSP) session setup procedure.

19. The apparatus of claim 12, wherein the receiver is configured to receive the second request at the candidate source peer directly from one or more requesting peers, and the transmitter is configured to transmit the information directly to the one or more requesting peers.

20. The apparatus of claim 12, wherein the receiver is configured to receive the second request at the candidate source peer from a central entity within the peer-to-peer streaming network, and the transmitter is configured to transmit the information to the central entity.

21. The apparatus of claim 12, wherein the one or more requesting peers are configured to initiate the second request in a decentralized distributed peer-to-peer streaming network, and the transmitter is configured to transmit the information to the one or more requesting peers through one or more other peers in the decentralized distributed Peer-to-peer streaming network.

22. An apparatus, comprising:
a transmitter configured to initiate a first request at a requesting peer in a peer-to-peer streaming network in order to setup a connection between the requesting peer and one or more candidate source peers;
the transmitter further configured to initiate a second request at the requesting peer for a content delivery from the one or more candidate source peers to the requesting peer once setup is complete;
a receiver configured to receive, in response to the initiated second request, information from the one or more candidate source peers related to availability of the content and detailed buffer status of the one or more candidate source peers, at the requesting peer, wherein the information relating to the one or more candidate source peers enables the requesting peer to select the candidate source peer as a selected candidate source peer to provide the content;
the requesting peer configured to select the selected candidate source peer;
the receiver further configured to receive, at the requesting peer, the content from the selected candidate source peer among the one or more candidate source peers that serves as the candidate source peer for at least one other requesting peer; and
when the selected candidate source peer determines in response to the selection that the second request for the content is not able to be accommodated, the transmitter is configured to redirect the second request to a redirect candidate source peer able to accommodate the second request to enable the requesting peer to select the redirect candidate source peer to receive the content.

23. The apparatus of claim 12, wherein the information further comprises a description of the status code associated with the availability of the content.

* * * * *